Patented Feb. 25, 1936

2,031,714

UNITED STATES PATENT OFFICE 2,031,714

PROCESS FOR THE PRODUCTION OF DISULPHIDES FROM MERCAPTOTHIAZOLS

Gerhard Källner, Ida- und Marienhutte, near Saarau, Germany, assignor to Silesia, Verein Chemischer Fabriken, Ida- und Marienhutte, near Saarau, Germany No Drawing. Application March 29, 1935, Serial No. 13,784. In Germany August 3, 1934

5 Claims. (Cl. 260—16)

A series of processes is already known for the production of disulphides from mercaptothiazols. Collectively such processes operate in the wet way, that is to say the substance to be oxidized is either suspended as such in water or is dissolved in water in the form of a salt and subjected to the action of oxidizing agents. It is also already known that for this purpose nitric acid or oxygen of the air can be used as oxidizing agent. For example, mercaptothiazol suspended in water has been oxidized with nitric acid. According to another known process the mercaptothiazol suspended in water or the aqueous solution of its salts has been treated with a mixture of air and nitrogen oxides. The disulphide formed in these processes separates in extremely finely divided form so that it filters badly and above all can only be washed completely free from salts by the use of very much water. The filter cake finally obtained, on account of the fine subdivision of the material, contains a large proportion of water the evaporation of which requires considerable time and expense.

The present process is based on an entirely new method for the production of disulphides from mercaptothiazols since it operates in the dry way. It has been found that mercaptothiazol can be oxidized rapidly and smoothly to the corresponding disulphide if it is treated in the form of an essentially dry fine powder with a mixture of nitrogen oxides and oxygen or a mixture of nitrogen oxides and oxygen-containing gases. As oxygen-containing gas use is made primarily of air; also other oxygen-containing gases can be employed, however, provided that the gases other than the oxygen present in the mixture do not interfere with the conversion of mercaptothiazol into disulphide. The conversion takes place without any external heating at room temperature, for instance at 15–25° C. It is, however, also possible to operate at raised temperature, but it is not advisable to raise the temperature beyond 80° C. A quantitative yield of the desired disulphide of extraordinary purity is obtained.

Example 1.—10 parts of 2-mercaptothiazol are treated in the form of a fine air-dried powder at 18–25° C. with a mixture of air and nitrogen oxides of the same temperature. For example, a gaseous mixture may be used as obtained by burning 1 part of ammonia with 10 parts of air. Furthermore mixtures may be used which are obtained by mixing air with nitrogen oxides that have been freed from nitrites or their solutions by the addition of acid. For example, a mixture is used which contains 5–10% nitrogen oxides. The treatment of the mercaptobenzothiazol with the gaseous mixture is, for example, carried out by passing the gas mixture through the continuously agitated powder or by passing the gas mixture over the powder which has been spread out in a thin layer or by letting the powder pass again and again in a suitable device through the gaseous mixture. Already after 20 to 40 minutes the oxidation is completed and the material is converted quantitatively in dibenzothiazyl disulphide of melting point 175–178° C.

Example 2.—10 parts of 6-methyl-2-mercaptobenzothiazol are treated, as described in Example 1, with air which contains nitrogen oxides. The disulphide results quantitatively.

Example 3.—50 parts of 2-mercaptobenzothiazol in the form of an air-dried fine powder are treated in the manner described above with a mixture of air and nitrogen oxides at a temperature of 60° C. The disulphide results quantitatively. It is for instance possible to treat the powdered initial material without preliminary heating, with a mixture of nitrogen oxides and air having a temperature of 60–80° C., or to treat the powdered initial material which is heated to 60° C. with gases of 60° C.

The invention is not limited to the oxidation of said mecaptothiazols, but may be used for the oxidation of any mercaptothiazols in the manner described.

I claim:

1. A process for the production of thiazole disulphides from mercaptothiazols characterized by the feature that an essentially dry, powdered mercaptothiazole is treated with oxygen in presence of nitrogen oxides.

2. A process for the production of thiazole disulphides from mercaptothiazols characterized by the feature that an essentially dry, powdered mecaptothiazole is treated with oxygen-containing gases in presence of nitrogen oxides.

3. A process according to claim 2, characterized by the feature that the treatment is carried out at temperatures below 80° C.

4. A process according to claim 2, characterized by the feature that the treatment is carried out at ordinary room temperature.

5. A process for the production of thiazole disulphides from mercaptothiazols characterized by the feature that an essentially dry, powdered mercaptothiazole is treated with air in presence of nitrogen oxides.

GERHARD KÄLLNER.